United States Patent [19]

Stasi et al.

[11] 4,415,336
[45] Nov. 15, 1983

[54] METHOD AND APPARATUS FOR CONTINUOUS PUMPING OF COMPRESSIBLE SOLIDS AGAINST HIGH PRESSURES

[75] Inventors: Michael A. Stasi, Downers Grove; Walker H. Bowman, St. Charles; Edward F. Rader, Wheaton, all of Ill.

[73] Assignee: Standard Oil Company (Indiana), Chicago, Ill.

[21] Appl. No.: 272,486

[22] Filed: Jun. 11, 1981

[51] Int. Cl.$^3$ .............................................. C10L 5/08
[52] U.S. Cl. ....................................... 44/13; 100/145
[58] Field of Search ........................... 44/10 A, 11-13; 100/145-150, DIG. 903, DIG. 904

[56] References Cited

U.S. PATENT DOCUMENTS

| | | | |
|---|---|---|---|
| 704,698 | 7/1902 | Edison | 44/13 |
| 2,817,287 | 12/1957 | Onarheim et al. | 100/147 |
| 2,944,286 | 7/1960 | Kullgren et al. | 100/145 |
| 3,232,722 | 2/1966 | Sanders | 44/13 |
| 3,877,365 | 4/1975 | Berggren | 100/148 |
| 4,074,803 | 2/1978 | Kollberg | 100/145 |
| 4,152,119 | 5/1979 | Schulz | 44/10 A |

OTHER PUBLICATIONS

Kirk—Othmer, *Encyclopedia of Chemical Technology*, 1964, John Wiley and Sons, Inc., vol. 4, pp. 668-671.

*Primary Examiner*—Thomas A. Waltz
*Assistant Examiner*—Margaret B. Medley
*Attorney, Agent, or Firm*—Marjorie D. Hunter; William T. McClain; William H. Magidson

[57] ABSTRACT

A method and apparatus is disclosed for feeding solid materials against high pressures wherein a compressible solid is continuously conveyed through a screw extruder having a design compression ratio of from about 50 to about 100 percent of the compression ratio of the solid material being conveyed.

3 Claims, 3 Drawing Figures

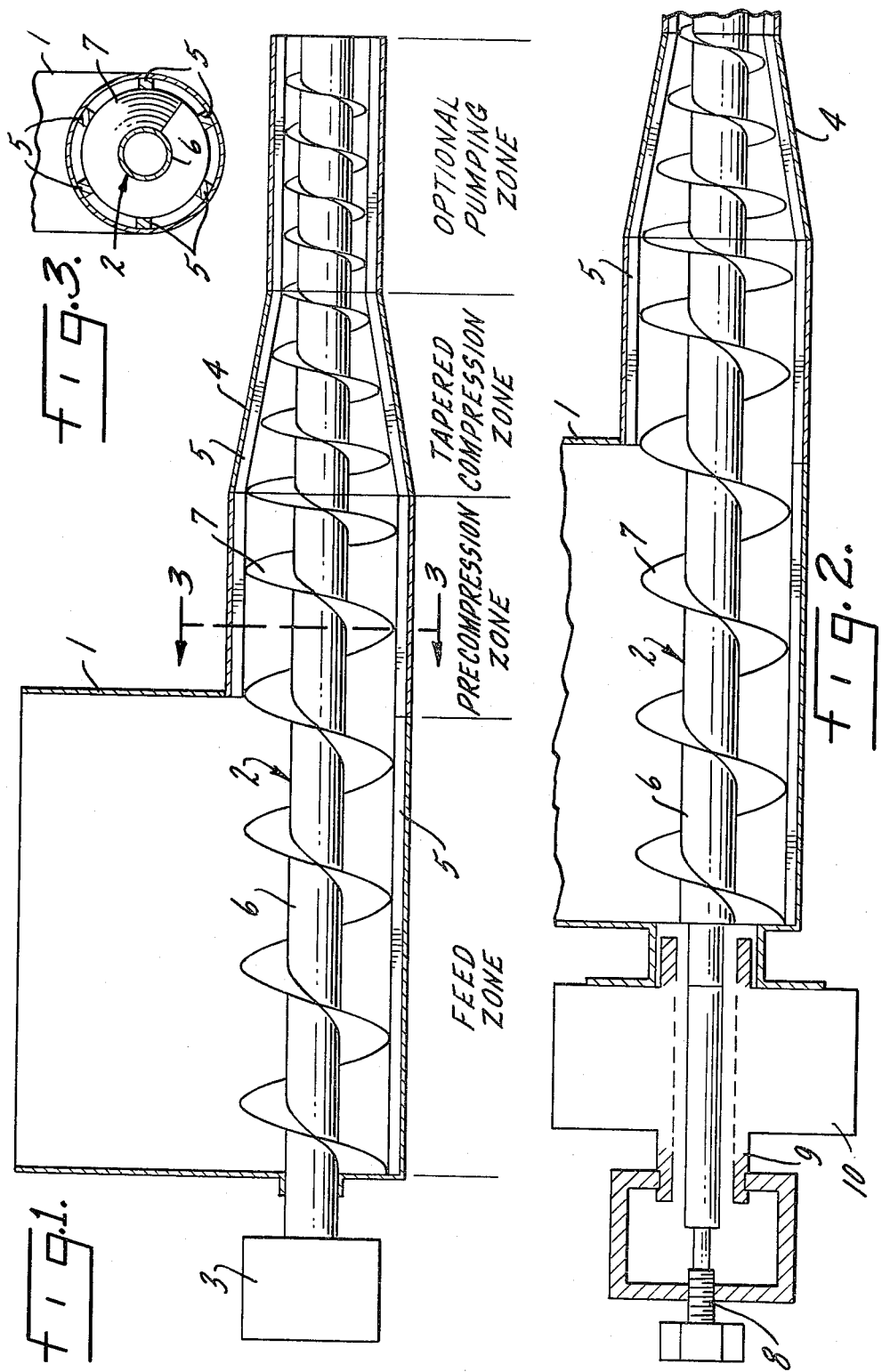

METHOD AND APPARATUS FOR CONTINUOUS PUMPING OF COMPRESSIBLE SOLIDS AGAINST HIGH PRESSURES

BACKGROUND OF THE INVENTION

Screw extruders have been typically designed and used for conveying viscous polymeric materials. More recently, the ability of screw extruders to handle solids has become of interest for the purpose of expanding our usable energy resource base through gasification and liquifaction of coal and biomass. For example, U.S. Pat. No. 4,191,535 to Furman teaches an extrusion apparatus for pumping coal-containing particulate mixtures with the aid of a lubricant to reduce power requirements. Also, a paper entitled, "Extrusion of Concentrated Cellulosic/Polymer Slurries" by D. H. White and D. Wolf, presented to the Society of Plastics Engineers at the Annual Technical Meeting in New York, May 5-8, 1980, discusses the use of an extruder to convey sawdust slurries against 3000 psi systems.

However, until now it has not been appreciated how to efficiently pump low density, compressible bulk solids against high pressures, which is a capability necessary to achieve economical conversion of biomass-type feedstocks to liquid fuels.

SUMMARY OF THE INVENTION

Therefore, in one aspect the invention resides in a method for feeding a solid material against high pressures (about 2000 psi or greater) comprising continuously conveying a compressible solid material through a screw extruder having a design compression ratio of from about 50 to about 100 percent of the compression ratio of the solid material being conveyed.

The solid material can be any compressible solid, but particularly including biomass materials such as wood chips, sawdust, hay, grass, leaves, peat moss, corn silage, oat straw, alfalfa hay, wheat straw, sunflowers, sudan grass, etc. The solid compressible material can also include mixtures of compressibles with noncompressibles such as a mixture of biomass and coal particles. Depending upon the particular biomass feedstock, varying amounts of water can also be present in order to obtain suitable flow characteristics within the extruder. In some cases it may be desirable to add water and in other cases the natural water content of the biomass is sufficient for optimal operations. The proper water level will readily be determined with minimal experimentation. In general, the water content will fall within the range of about 10-45 weight percent.

The screw extruder should preferably be designed to achieve a design compression ratio, based upon swept volume considerations, of about the same as that of the material being conveyed through the extruder. This design compression ratio can be as low as about 50% of the compression ratio for the material being conveyed and still achieved satisfactory flow characteristics. However, lower design compression ratios tend to result in surging and slipping which grinds the biomass into a fine mud-like material. This in turn causes more slippage, which can lead to jamming of the extruder. On the other hand, design compression ratios much above that of the material being conveyed also result in jamming of the extruder.

In another aspect, the invention resides in a screw extruder comprising: (a) an extruder screw rotatably housed within an extruder barrel; (b) a feed zone, wherein the feed is engaged by the extruder screw; (c) a precompression zone wherein the feed is conveyed within the extruder barrel by a section of the extruder screw having constant or changing pitch; (d) a tapered compression zone comprising a conical barrel section and a corresponding conical screw section wherein the feed material is compressed; and (e) an optional pumping zone having substantially no further design compression, wherein the compressed material is conveyed out of the extruder.

More specifically, the invention resides in an extruder containing stator bars in all zones in order to prevent any rotation of the material within the extruder barrel. Any such rotation detracts from the operating efficiency of the extruder on the basis of energy utilization. The stator bars must be arranged and designed such that they protrude from the extruder barrel at least 0.125 inch. In addition, the width of the protrusions must be substantially less than the distance between stator bars (measured along the circumference of the extruder barrel). Preferably, the ratio between the width of the stator bars and their circumferential distance apart is about 1:7. Maintaining the above-mentioned ratio near the optimum requires that the stator bars be tapered in the tapered compression zone such that the resultant depressions between the bars have nearly parallel sides. If the ratio increases beyond 1:1, the extruder barrel essentially becomes one having grooves rather than having protrusions. It has been found that grooves are essentially ineffective in preventing rotation, apparently because they are easily filled with material and thereafter provide little resistance to rotation.

Still more specifically, the invention resides in an extruder having an adjustable compression ratio in order to process a variety of feedstocks having different compression ratios. This can be accomplished in one embodiment by attaching a jackscrew to the extruder screw such that rotation of the jackscrew forces the extruder screw either forward or backwards as desired. By thus changing the position of the extruder screw relative to the tapered portion of the extruder barrel in the tapered compression zone, a change in the compression ratio of the extruder is achieved.

BRIEF DESCRIPTION OF THE DRAWING

FIG. 1 is a schematic side-sectional view of an extruder in accordance with this invention, primarily illustrating the various zones within the extruder.

FIG. 2 is also a schematic side-sectional view of an extruder in accordance with this invention, primarily illustrating a jackscrew drive means.

FIG. 3 is a cross-sectional view taken along line 3—3 of FIG. 1, primarily illustrating the spacing of the stator bars.

DETAILED DESCRIPTION OF THE DRAWING

Referring to FIG. 1, shown is an extruder containing four distinct zones as labelled, namely: a feed zone, where the feed material from the feed hopper 1 is engaged by the feed section of the extruder screw 2 driven by a drive means 3; a precompression zone, wherein the feed material is compressed by the decreasing the pitch of the screw; a tapered compression zone, wherein the feed material is compressed by the decreasing internal volume defined by the tapered extruder barrel walls 4; and an optional pumping zone, wherein the compressed feed material is transferred from the extruder, generally into a high pressure vessel such as a reactor. Very high pressures can develop in this area due apparently to excessive frictional forces. This may or may not be desirable, depending upon the pressure against which the material is being conveyed. Also shown in FIG. 1 are stator bars 5 which are necessary to prevent rotation of the feed material within the barrel as the screw rotates. Stator bars are desirable in all four zones to realize maximum energy efficiency. Although not a requirement for purposes of this invention, all embodiments illustrated show an extruder screw having a root 6 of essentially constant diameter because such a screw is easier to fabricate. Also shown is the decreasing pitch of the screw flights 7 in the precompression and compression zones.

FIG. 2 illustrates the same screw extruder with a preferred drive means which is capable of varying the compression ratio of the extruder by changing the position of the screw relative to the tapered portion of the extruder barrel. This is accomplished by turning a jackscrew 8 which is threaded through the inside of the hollow output shaft 9 of the gear reducer 10. The jackscrew is in contact with the root of the extruder screw such that the extruder screw can be displaced forward within the extruder by tightening the jackscrew, thereby increasing the design compression ratio. To move the extruder screw backward and therefore decrease the design compression ratio, the jackscrew is simply loosened, thus allowing the extruder screw to "float" backward as a result of the pressure within the extruder. This design provides considerable flexibility in changing the design compression ratio of the extruder in order to accommodate different feed materials. The fibrous nature of biomass feed materials particularly allows for a considerably large clearance between the flights of the extruder screw and the extruder barrel. However, there is a maximum allowable clearance between the screw and the barrel beyond which pumping or conveying efficiency will decrease rapidly. With the aid of the jackscrew, the optimal design parameters can be readily determined without undue trial and error.

FIG. 3 illustrates the spacing of the stator bars 5 within the extruder barrel 3. (No clearance between the extruder screw flights 7 and the stator bars is illustrated, but in practice there is some clarance which is variable.) The size and spacing of the stator bars can vary depending upon the feed characteristics. However, we have found that a height (protruding inwardly from the barrel) of about 0.188 inch to about 0.25 inch to be satisfactory for most feeds using a barrel diameter varying from 7.5 inches to 3.5 inches. In general, the ratio of the distance between stator bars to the height of the stator bars should be about 7:1, but this can vary.

EXAMPLES

For conveying biomass against design pressures of about 3000 psi or greater, an extruder was designed which was divided into several sections corresponding to the four zones previously discussed. Both the screw and barrel segments of each section were removable to allow greater design flexibility as well as convenience in servicing the extruder. In operation, the compression ratio of the extruder was preferably matched as closely as possible to that of the biomass by varying the pitch (distance between screw flights) of the extruder screw, which has a constant root diameter, and by decreasing the outer diameter of the screw flights to form a tapered cone section matching that of the barrel. The various sections of the experimental unit were as follows:

Feed Section

Biomass was gravity-fed into the feed section such that the first flight of the screw was always exposed. The feed section screw had a constant pitch and constant root diameter. The screw material was sheet metal because of the low forces involved at this point. The details of the feed section were as follows:

| | |
|---|---|
| Total Length = | 21 inches |
| Screw: | |
| Pitch = | 3.5 inches |
| Root Diameter = | 3.5 inches |
| Outside Diameter = | 6.75 inches |
| Flight Thickness = | 0.188 inch |
| Barrel: | |
| Inside Diameter = | 7.5 inches |

Precompression Section

The precompression section can have constant or changing pitch. When conveying different types of biomass which require a higher rate of compression than is otherwise available with a constant pitch, this portion of the screw can be replaced with a section having a gradually changing pitch, preferably over a distance of four screw diameters. (Decreasing the pitch increases the compression.) The details for the precompression section were as follows:

| | |
|---|---|
| Total Length = | 14 inches |
| Screw: | |
| Pitch = | 3.5 inches |
| Root Diameter = | 3.5 inches |
| Outside Diameter = | 6.75 inches |
| Flight Thickness = | 0.188 inch |
| Barrel: | |
| Inside Diameter = | 7.5 inches |

Compression Section

This is the most crucial portion of the extruder since this is where the highest compression occurs. Both the barrel and screw were tapered at an 8° angle to form a cone section. This section provided for a design compression ratio of 9.95/1. During operation, the first six inches characterized were by low internal forces such that a sheet metal screw was sufficient. High forces lie in the last eight inches of the section. Therefore the screw material was 4140 carbon steel. The cone barrel was constructed in such a way that it could be split apart if clogging occurred. The details of the compression section were as follows:

| | |
|---|---|
| Total Length = | 14 inches |
| Screw: | |
| Pitch = | 3.5 inches |
| O.D. (initial) = | 6.75 inches |
| O.D. (final) = | 3.5 inches |
| Flight Thickness (first 6") = | 0.1875 inch |
| (final 8") = | 0.375 inches |
| Barrel: | |
| Inside Diameter (initial) = | 7.5 inches |
| Inside Diameter (final) = | 3.5 inches |
| Tapered Stator Bar Width (feed end) = | 2.2 inches |
| Tapered Stator Bar Width (Discharge End) = | 0.75 inch |

| -continued | |
|---|---|
| Tapered Stator Bar Height = | 0.188 inch |

Optional Pumping Section

Based upon compression studies of various biomass feed materials, the compression section of the extruder should be sufficient to compress the biomass to within about 50–100 percent of its compression ratio at 3000 psi, which was the design pressure. If additional compression is needed, an optional section can be attached which will increase compression by increasing pressure due to frictional forces within the pumping section. The details for the optional pumping section were as follows:

| | | |
|---|---|---|
| | Total Length = | 14 inches |
| Screw: | | |
| | Pitch = | 3.5 inches |
| | Root Diameter = | 2.75 inches |
| | Outside Diameter = | 3.25 inches |
| | Flight Thickness = | 0.385 inch |
| Barrel: | | |
| | Inside Diameter = | 3.32 inches |

Both the barrel and screw sections could be easily disassembled when needed. The barrel sections were connected by flanges and the screw sections were threaded. The compression and optional pumping sections were split barrels to facilitate unjamming and maintenance of the machine.

EXAMPLE 1

Two series of runs were made to illustrate the effectiveness of matching the design compression ratio to that of the biomass when optimizing the specific horsepower. In the first series of runs, the extruder design compression ratio was varied by adjusting the axial position of the screw. Wood chips were the biomass feed material and the results are shown in TABLE I.

TABLE I

| Biomass | Design Compression Ratio | Biomass Compression Ratio | lb/hr-hp |
|---|---|---|---|
| Wood | 8.3/1 | 9.4/1 | 44 |
| Wood | 9.2/1 | 9.4/1 | 52 |
| Wood | 10.1/1 | 9.4/1 | Jammed due to over-compression |

These results illustrate that if the design compression ratio exceeds that of the biomass, jamming of the extruder can occur.

In the second series of runs, the extruder design compression ratio was maintained constant while that of the biomass was varied. The results are shown in TABLE II.

TABLE II

| Biomass | Design Compression Ratio | Biomass Compression Ratio | lb/hr-hp |
|---|---|---|---|
| Wheat Straw | 8.3/1 | 27.5/1 | 36 |
| Oat Straw | 8.3/1 | 22.7/1 | 38 |
| Sudan Grass | 8.3/1 | 14.2/1 | 44 |
| Alfalfa Hay | 8.3/1 | 10.8/1 | 60 |

These results illustrate the improvement in efficiency as the design compression ratio approaches that of the biomass.

It will be apparent to those skilled in the art of extrusion that many variations from the foregoing examples, shown for purposes of illustration, can be made without departing from the scope of the invention.

We claim:

1. A method for compressing a low density, compressible bulk solid material comprising biomass and containing from about 10 to about 45 weight percent water which comprises feeding said material into a high pressure environment of a least 2000 psi by continuously conveying the material through a screw extruder comprising:
    (a) Introducing the material into a feed zone wherein the material is engaged by an extruder screw without compression;
    (b) Conveying the material to a precompression zone wherein the extruder screw has a constant or changing pitch;
    (c) Compressing the material in a tapered compression zone comprising a conical extruder barrel section and a corresponding conical screw section; and
    (d) Further compressing and conveying the material within a pumping zone having a constant root diameter, constant pitch, and constant barrel diameter such that the design compression ratio of the screw extruder is from 50 to 100 percent of the compression ratio of the solid material being conveyed.

2. The method of claim 1 wherein the design compression ratio of the screw extruder is about equal to the compression ratio of the solid material.

3. The method of claim 1 wherein the solid material comprises a mixture of biomass and coal particles.

* * * * *